United States Patent

Smith et al.

[11] Patent Number: 5,219,199
[45] Date of Patent: Jun. 15, 1993

[54] STABILIZED SLIDE-OUT VISOR

[75] Inventors: Nels R. Smith; Joseph A. Priebe; Steven E. Vander Veen; Kenneth M. Lindberg, all of Holland, Mich.

[73] Assignee: Prince Corporation, Holland, Mich.

[21] Appl. No.: 871,956

[22] Filed: Apr. 21, 1992

Related U.S. Application Data

[60] Continuation-in-part of Ser. No. 769,535, Oct. 1, 1991, Pat. No. 5,197,777, which is a division of Ser. No. 604,680, Oct. 26, 1990, Pat. No. 5,067,764.

[51] Int. Cl.$^5$ .............................................. B60J 3/02
[52] U.S. Cl. ................................... 296/97.8; 296/97.4
[58] Field of Search ................... 296/97.8, 97.4, 97.1

[56] References Cited

U.S. PATENT DOCUMENTS

| | | | |
|---|---|---|---|
| 2,289,644 | 7/1942 | Gano, Jr. | 296/97.8 |
| 2,444,524 | 7/1948 | Parrish, Jr. | 296/97.8 |
| 2,559,471 | 7/1951 | Schrock | 296/97.11 |
| 3,226,151 | 12/1965 | Reuther | 296/97.4 |
| 4,149,749 | 4/1979 | Canal | 296/97.1 |
| 4,468,062 | 8/1984 | Marcus et al. | 296/97.8 |
| 4,491,360 | 1/1985 | Fleming | 296/97.8 |
| 4,492,404 | 1/1985 | Marcus et al. | 296/97.8 |
| 4,674,789 | 6/1987 | Watjer et al. | 296/97.8 |
| 4,697,843 | 10/1987 | Tomforde | 296/97.8 |
| 4,824,160 | 4/1989 | Fleming | 210/17.4 |
| 4,844,530 | 7/1989 | Mahler et al. | 296/97.1 |
| 4,874,195 | 10/1989 | Lu et al. | 296/97.4 |
| 4,904,013 | 2/1990 | Canadas | 296/97.4 |
| 4,929,014 | 5/1990 | Clark et al. | 296/97.8 |
| 4,989,910 | 2/1991 | Mersman et al. | 296/97.4 |
| 5,000,506 | 3/1991 | Abu-Shumays et al. | 296/97.4 |
| 5,031,952 | 7/1991 | Miyamoto et al. | 296/97.4 |

FOREIGN PATENT DOCUMENTS 2-200518  8/1990  Japan .

OTHER PUBLICATIONS

Dec. 20, 1991, entitled Low Profile Visor Assembly
Mar. 31, 1992, entitled Curvilinear Sliding Visor.

*Primary Examiner*—Robert R. Song
*Attorney, Agent, or Firm*—Price, Heneveld, Cooper, DeWitt & Litton

[57] ABSTRACT

A slide-out visor assembly includes a mounting member shaped to be secured to a vehicle and includes a pair of spaced parallel guide tracks and a visor panel which is mounted to a pivot arm assembly having slides mounted to the guide tracks for sliding movement of the pivot arm assembly and visor panel with respect to the mounting member. The assembly further includes a stabilizing structure extending between the mounting member and the pivot arm assembly for stabilizing the motion of the pivot arm assembly and visor panel during movement between a stored position typically behind the headliner of a vehicle to a lowered use position extended from behind the vehicle headliner. In a preferred embodiment of the invention, the stabilizing structure is at least one cord which extends between the mounting member and each of the slides for assuring that the slides move through substantially identical distances as the visor panel is moved.

22 Claims, 3 Drawing Sheets

STABILIZED SLIDE-OUT VISOR

CROSS REFERENCE TO RELATED APPLICATIONS

This is a continuation-in-part application of pending U.S. patent application Ser. No. 07/769,535, filed Oct. 1, 1991, entitled VISOR WITH EXTENDABLE PANEL, U.S. Pat. No. 5,197,777, which is a divisional application of Ser. No. 07/604,680, filed Oct. 26, 1990, now U.S. Pat. No. 5,067,764 entitled VISOR WITH EXTENDABLE PANEL issued on Nov. 26, 1991, the disclosures of which are incorporated herein by reference.

BACKGROUND OF THE INVENTION

The present invention pertains to automotive visors and particularly to a stabilized slide-out visor assembly.

There exists a variety of visors which extend outwardly from a storage position behind a vehicle headliner. Such construction is represented, for example, by U.S. Pat. Nos. 4,491,360; 4,492,404; and 4,989,910. In order to provide a smooth acting visor control for the movement of the visors from behind the headliner outwardly to a lowered use position, typically multiple pivot arms or a synchronized rack and pinion guide mechanism have been used to provide stable, smooth operation of the visor in its movement.

Sliding planar visors which extend in edge tracks and include stabilizing mechanisms are also known and are typified by U.S. Pat. No. 4,149,179. Such visors tend to bind or stick due in part to widely varying temperatures to which a visor positioned immediately adjacent the roof are subjected in the automotive environment. A visor which extends behind the headliner must be capable of withstanding large temperature differentials during their operation and still provide approximately the same general operational characteristics or "feel" to the user. A sliding mechanism such as a rectangular visor panel captively held at opposite edges in tracks will not provide this desired visor control. In compactly designed vehicles where roof lines are severely angled and space in the headliner area is at a premium, the use of a large conventional slide mechanism is impractical.

SUMMARY OF THE PRESENT INVENTION

The system of the present invention provides a slide-out visor assembly in which a mounting member is shaped to be secured to a vehicle and includes a pair of spaced parallel guide tracks and a visor panel which is mounted to a pivot arm assembly having slides mounted to the guide tracks for sliding movement of the pivot arm assembly and visor panel with respect to the mounting member. The assembly further includes means extending between said mounting member and said pivot arm assembly for stabilizing the motion of the pivot arm assembly and visor panel during movement between a stored position typically behind the headliner of a vehicle to a lowered use position extended from behind the vehicle headliner. In a preferred embodiment of the invention, the stabilizing means comprises at least one cord which extends between the mounting means and each of the slides for assuring that the slides move through substantially identical distances as the visor panel is moved.

In a preferred embodiment of the invention, the pivot arm assembly includes a pivot rod extending between the slides and torque means pivotally coupled to said visor panel to said pivot rod to allow the visor panel to be pivoted to a variety of inclined positions once extended from the mounting member. The resultant structure provides a controlled smoothly operating slide-out visor panel which is of low-profile and therefore suitable for use in modern vehicles in which space is at a premium. The control mechanism coupling the visor panel to the mounting member assures consistent, smooth, even operation through the wide range of environmental conditions encountered in the vehicle environment. These and other features, objects and advantages of the present invention will become apparent upon reading the following description thereof together with reference to the accompanying drawings in which:

DETAILED DESCRIPTION OF THE PREFERRED EMBODIMENT

Figure 1:
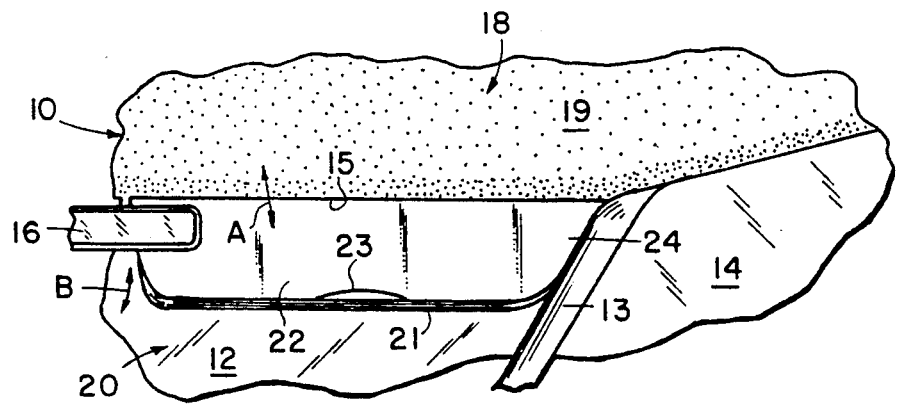
FIG. 1 is a perspective view of a vehicle embodying a visor assembly of the present invention.

Referring initially to FIG. 1, there is shown a right front interior of a vehicle 10 which includes a windshield 12, a right side front passenger side window 14 and a rearview mirror assembly 16. An angled support post 13 (A-pillar) extends between the side window and the windshield. Extending above the windshield is the headliner 18 of the vehicle which typically is upholstered with a fabric 19 conforming to the vehicle's generally interior decor. The headliner will frequently include a variety of accessories mounted thereto and can be conventionally secured to the sheet metal roof structure of the vehicle by means of mounting structures such as snap-fasteners, screws, hook-and-loop fasteners and the like. The lower forward edge of the headliner 18 includes a space between the inner surface of the headliner facing the sheet metal roof and the sheet metal roof defining a gap 15 from which a visor assembly 20 of the present invention including a visor panel 22 can be extended for use as seen in FIG. 1.

Visor panel 22 includes a recessed handgrip 23 located at the center of its lower edge such that it can be easily grasped when in a retracted position in the space provided by gap 15. Visor panel 22 includes a reinforcing curved edge 21 which also provides a trim appearance to the visor panel. The right edge 24 (FIG. 2) of panel 22 is angled to conform generally to the angle of A-pillar 13 for completely blocking the area of the windshield both behind the rearview mirror 16 and in the upper right corner of the windshield as seen in FIG. 1. Visor panel 22 moves in an angled direction generally indicated by Arrow A in FIG. 1 utilizing the mounting and control mechanism described below in connection with the remaining FIGS. to move between a moved retraced stored position behind headliner 18 to the lowered used position shown. Visor 22 also can pivot forward and aft in a direction indicated by Arrow B in FIG. 1 for providing adjustable angle of use with respect to the windshield 12.

Figure 3:
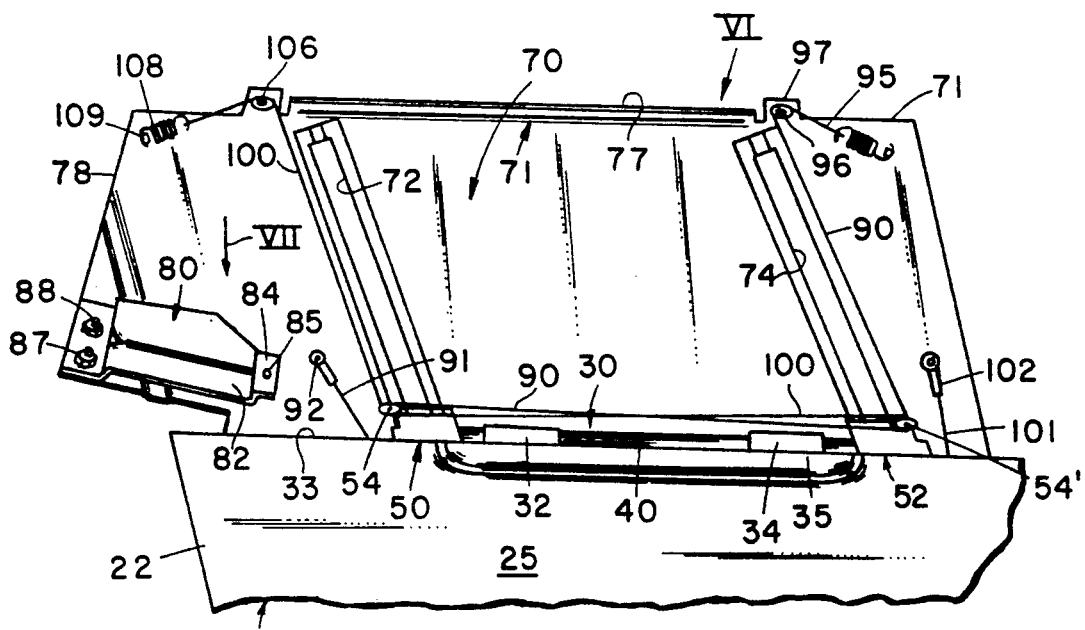
FIG. 3 is a fragmentary front elevational view of the structure shown in FIG. 2 showing the visor panel in a fully extended position.
Figure 4:
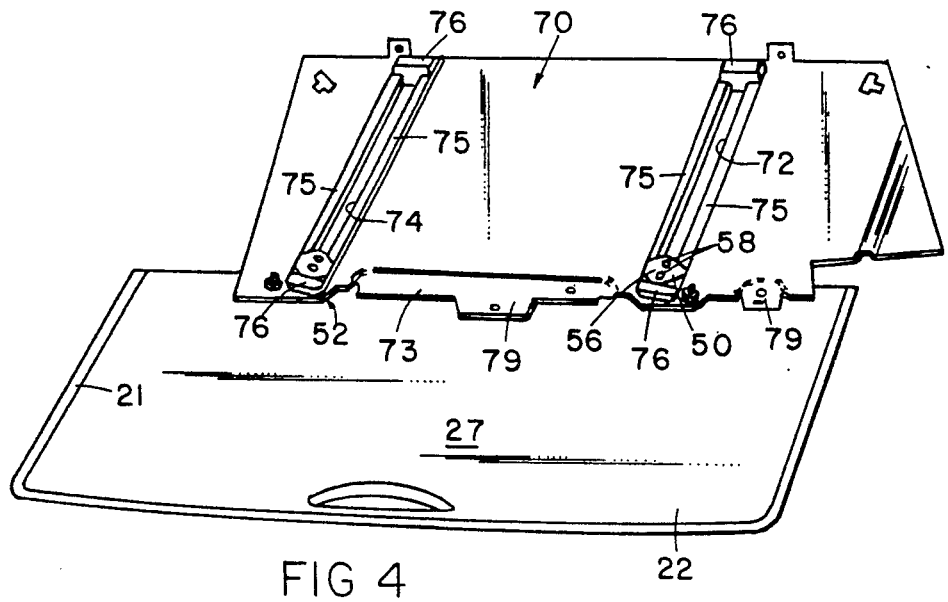
FIG. 4 is a rear elevational view of the structure shown in FIG. 3.
Figure 5:
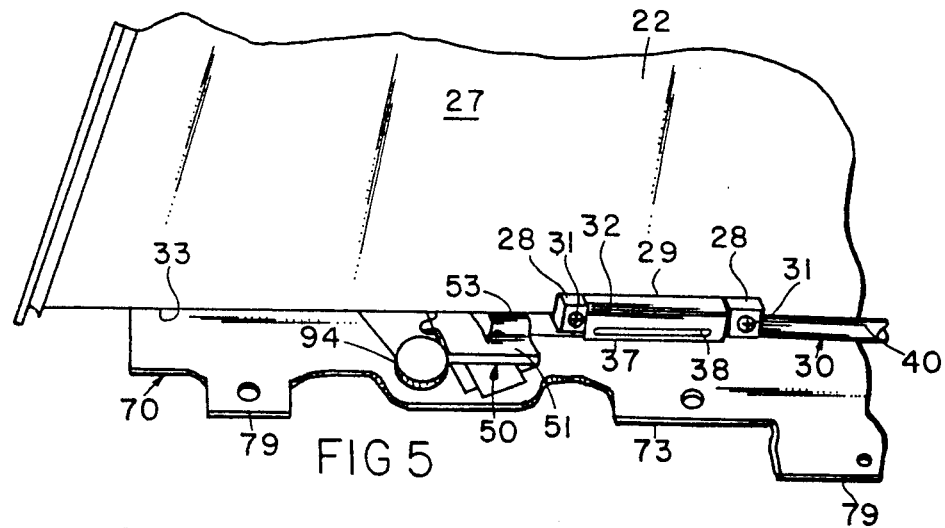
FIG. 5 is an enlarged fragmentary perspective view of one end of the pivot arm assembly coupling the mounting member to the visor panel taken in the direction of arrow V of FIG. 3 but with the visor panel raised.

Turning now to the remaining FIGS., the visor assembly 20 is shown prior to installation in the vehicle. Panel 22 includes a front surface 25, a rear surface 27 (FIGS. 4 and 5), and a peripheral reinforcing ridge 21 which extends around the edges of the visor as best seen in FIG. 4. As seen in FIGS. 3 and 5, visor panel 22 is coupled to a pivot arm assembly 30 by means of a pair of spaced torque clips 32 and 34 which are of U-shaped cross-sectional construction and made of spring steel. They include mounting flanges 31 on opposite sides thereof as best seen in FIG. 5 for securing each of the U-shaped spring torque clips 32 and 34 to mounting bosses 28 on opposite sides of a torque clip receiving notch 29 along the upper edge 33 of visor panel 22. The notches 29 can extend only partially through the visor panel to provide sufficient clearance for the torque clips 32 and 34 and a cover filet of material 35 may extend along the upper edge 33 to conceal the torque clips as seen in FIG. 3. The spring torque clips 32 and 34 have an open end defined by the spacing between the legs of the U-shaped structure. Each leg includes a longitudinal inwardly extending rib 38 extending inwardly from each of the edges 37 of each leg of the torque clip for holding the torque clips 32 and 34 to the pivot rod once snapped over the pivot rod 40 for retaining the visor on the rod. A suitable lubricating grease (not shown) may be provided between the U-shaped spring clip torque devices 32 and 34 and the steel pivot rod 40 to assure smooth and noise free operation for pivoting the visor panel 22 in a direction indicated by Arrow B when in a lowered use position. The compressive force of the U-shaped torque clips is sufficient to retain the visor panel on the pivot rod without additional attachment means other than the assistance of the concave ribs 38 into which the circular cross-sectional diameter pivot rod 40 is matably received. In some installations, it may be desirable to provide a reduced diameter section of the pivot rod 40 for receiving the visor torque clips 32 and 34 and thereby preventing longitudinal shifting of the visor panel along the longitudinal axis of pivot rod 40. In a preferred embodiment, it was discovered that this was unnecessary, however.

The opposite ends of the pivot rod 40 are fixedly anchored to slide means 50 and 52 which are of substantially identical mirror image construction and accordingly, only slide 50 is described in detail with reference particularly to FIGS. 3, 4 and 5. Each of the slides includes a front plate 51 (FIG. 5) which is integrally molded of a polymeric material such as polycarbonate and which includes a mounting boss 53 for receiving an end of the pivot rod 40. Member 51 is molded onto the end of rod 40 which may include an outwardly extending projection for locking the pivot rod to the mounting member. The corner of the generally trapezoidal first plate 51 opposite mounting boss 53 includes a raised corner guide 54 (FIG. 3) which is described in greater detail below and over which one of the stabilizing cords 100 extends. On a side of plate 5 opposite the mounting member 70 is a second plate 56 (FIG. 4) having a pair of apertures extending therethrough for receiving fastening screws 58 mounting the plate 56 to plate 51 sandwiching the mounting member 70 between the two plates 51 and 56. Plate 56 includes a narrowed central body or web 59 (FIG. 7) having a width substantially equal to the width of a first guide slot 72 formed in mounting member 70 such that when plates 56 and 51 are coupled by fasteners 58, the web 59 fits within slot 72 with the plates forming flanges on opposite sides of member 70 captively holding the slide 50 to member 70 while allowing the slide to travel along the inclined slot 72 with relative ease. The length of the center web 59 of slide 50 is approximately 1 inch in the preferred embodiment to provide sufficient guided support along slot 72 while plates 51 and 56 have a width sufficient to overlie the opposite edges of slot 72 to securely hold the slide within the slot.

Figure 2:
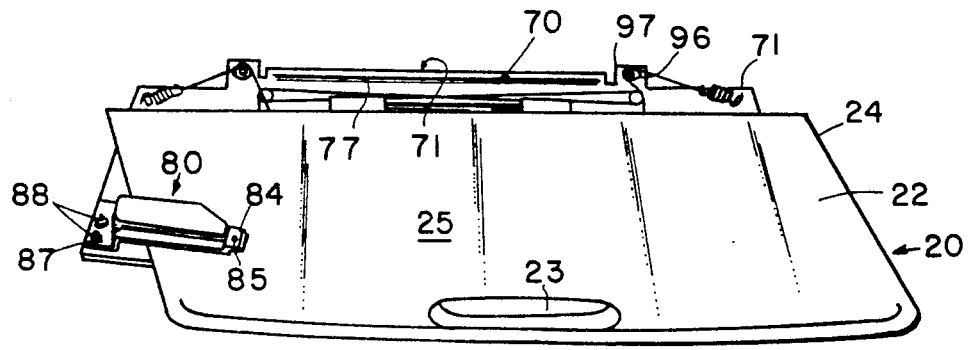
FIG. 2 is a front elevational view of the visor assembly of the present invention shown prior to installation in a vehicle and shown with the visor panel in a fully retracted position.

The mounting member 70 includes a second slot 74 for receiving the substantially identical mounting slide 52 in substantially the same manner. Each of the slots 72 and 74 formed in the stamped metal mounting member 70 are bonded on opposite edges by U-shaped polymeric glides 75 made of polypropolene which provide a lubricious polymeric surface for the polymeric slide means 50 and 52 in their travel along the length of the slots. Opposite ends of the slots 72 and 74 also include rubber end stops 76 mounted therein for providing a controlled cushioned stop for the travel limits of motion of the visor panel 22. Mounted to one edge 78 of mounting member 70 is an L-shaped guide bracket 80 having an overwrap of fabric 82 applied thereto and under which, as best seen in FIG. 2 the visor panel 22 extends for controlling the visor within the space of slot 15 (FIG. 1) of the headliner. Member 80 may include a mounting tang 84 with an aperture 85 therein for securing the L-shaped guide 80 to the headliner. The opposite end of guide 80 is secured by means of fastener screws 88 through a mounting flange 87 which extends along edge 78 of the mounting member 70 as seen in FIGS. 2 and 3.

The bottom edge 73 of mounting member 70 includes a plurality of mounting tangs 79 having apertures formed therein for mounting member 70 to the sheet metal roof structure of a vehicle. Likewise the upper edge 71 (FIGS. 1, 2 and 6) of member 70 includes a lip 77 having apertures 78' (FIG. 6) for securing this edge of the mounting member 70 to a vehicle sheet metal roof support. In order to further stabilize the motion of visor panel 22 with respect to the mounting member 70, in the preferred embodiment, a cord stabilization system is employed and is now described.

Figure 6:
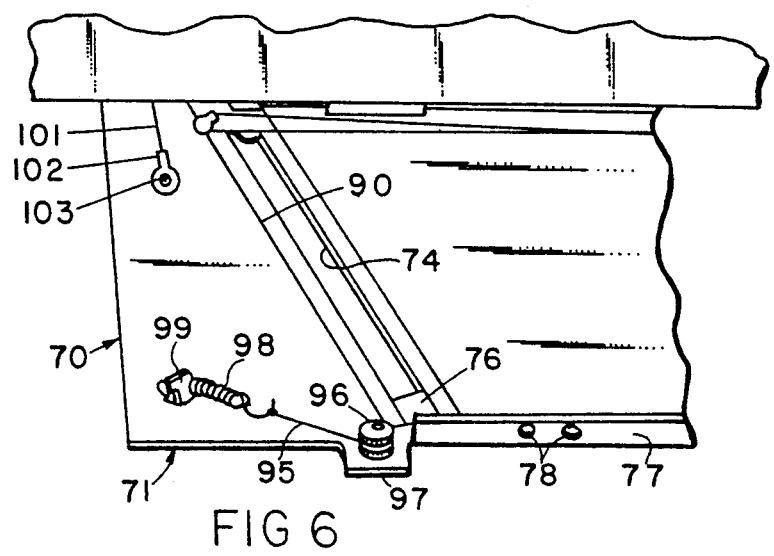
FIG. 6 is an enlarged fragmentary perspective view of a portion of the visor assembly taken in the direction of arrow VI of FIG. 3.
Figure 7:
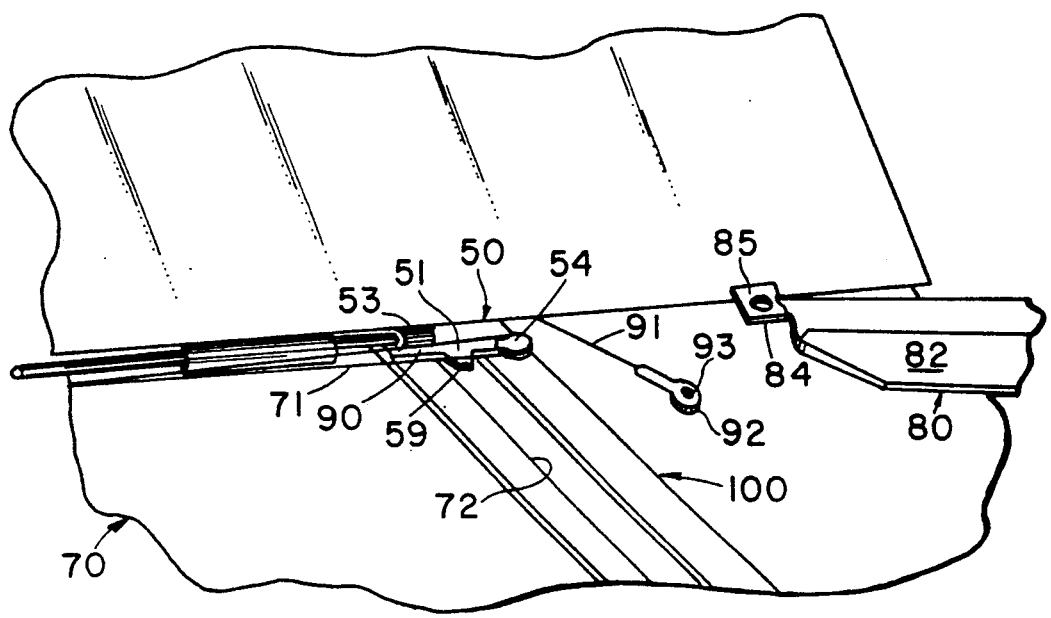
FIG. 7 is a fragmentary perspective view of a corner of the visor assembly opposite that shown in FIG. 6 and taken in the direction of arrow VII of FIG. 3.

As best seen in FIGS. 3, 6, 7 and 8, the sliding pivot arm assembly 30 is stabilized by a pair of cords 90 and 100. As seen in FIG. 7, a first end 91 of cord 90 is anchored to member 70 by means of an eyelet 92 secured to the end of cord 90 and hooked over a tang 93 formed in the sheet metal plate member 70. Cord 90 then extends around a first spool-shaped guide 94 (FIGS. 5 and 8) mounted to member 70 near the edge 73 of member 70 and then downwardly and around guide 54 of slide 50 as best seen in FIG. 7. Cord 90 then extends across the top edge 71 of member 70, crossing cord 100, and around a similar guide 54' of slide 52 thence through the side in parallel spaced relationship to slot 74 to a second guide 96 positioned near the top edge 71 of member 70 on a tang 97 extending therefrom as best seen in FIGS. 3 and 6. Cord 90 then extends downwardly and has its end 95 attached to a loop formed on one end of a tension spring 98 such as a coil spring. The opposite end of spring 98 also includes a loop which is fitted over a lug 99 integrally stamped in plate 70 as best seen in FIG. 6.

Figure 8:
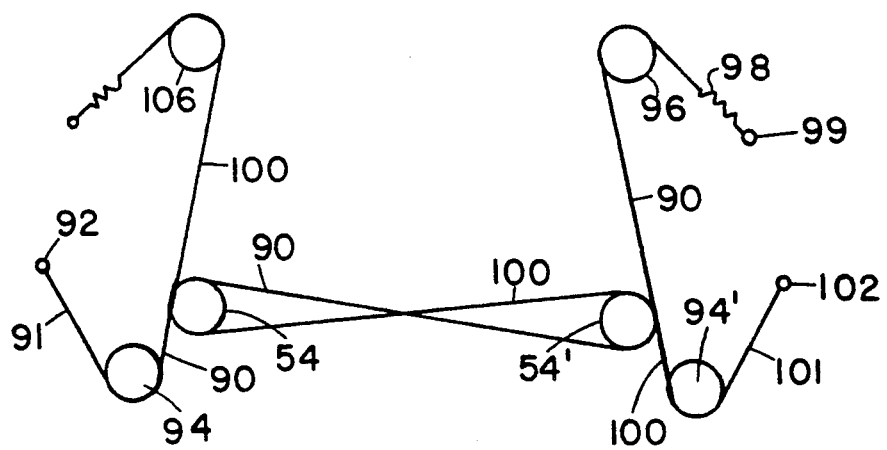
FIG. 8 is a schematic diagram of the path of the stabilizing cords employed in the preferred embodiment of the invention.

Similarly, cord 100 includes a first end 10 (FIGS. 6 and 8) anchored to member 70 by means of an eyelet 102 and tang 103. Cord 100 extends downwardly from tang 103 to a guide 94' (FIG. 8) similar to guide 94 except located on the opposite side and not otherwise shown in the drawings, thence downwardly around guide 54' under cord 90 and crossing cord 90 along the bottom of plate 72 as seen in FIGS. 3 and 8. Cord 100 then extends around guide support 54 of slide 50 thence downwardly parallel and adjacent to slot 72 around a turning guide 106 secured to the end of a tension spring 108 having its opposite end mounted to a lug 109 in the same manner as spring 98.

The strings 90 and 100 do not slide along the turning guides 94 and 94' or roller-type guides 96 and 106 which serve only as direction changing members. As the visor, however, slides between a stored position as seen in FIG. 2 to an extended position as seen in FIGS. 1 and 3, however, the cords 90 and 100 slide over the guides 54 and 54' of each of the slides 50 and 52 from opposite sides tending to stabilize the visor motion preventing chucking or skewing of the slides 50 and 52 and visor panel 22 mounted thereto as the slides move along tracks 72 and 74 respectively. In the preferred embodiment, cords 90 and 100 were made of a woven NYLON string although other materials could be used.

In some embodiments, it may be desirable to use a single cord instead of two cords. In such case, the opposite ends 95 and 105 of cords 90 and 100 would be joined together by a tensioning device such as a spring. In such case, the cord would be wound around turning blocks 96 and 106 in a direction opposite to that shown in FIG. 3 and the single tensioning spring could be located adjacent the edge 71 of member 70. In the single cord embodiment, it is necessary to anchor the cord to member 70 at some location such as along edge 71 so that the only relative movement occurs between the guide members of the slides and the cord as the visor panel is moved.

It will become apparent to those skilled in the art that these and various other modifications to the preferred embodiment of the present invention can be made without departing from the spirit or scope as defined by the appended claims.

The embodiments of the invention in which an exclusive property or privilege is claimed are defined as follows:

1. A vehicle visor assembly comprising:
   a visor mounting member including means for attaching said mounting member behind the headliner of a vehicle;
   a visor panel;
   means for slidably supporting said panel on said mounting member for allowing said panel to move between a stored position and a use position, said supporting means including guide track means formed in one of said visor panel and visor mounting member, and co-operating with slide means on the other of said visor panel and mounting member; and
   stabilizing means extending between said visor panel and said mounting member, wherein said stabilizing means comprises cord means extending between said visor panel and said mounting member for controlling the sliding motion of said visor panel as it is extended and retracted.

2. The apparatus as defined in claim 1 wherein said guide track means comprises a pair of spaced parallel slots formed in said mounting member.

3. The apparatus as defined in claim 2 wherein said slide means includes a pair of slides and means for coupling said slides to said visor panel.

4. The apparatus as defined in claim 3 wherein said means for coupling said slides to said visor panel comprises a pivot rod and torque control means extending between said pivot rod and said visor panel.

5. The apparatus as defined in claim 4 wherein said slides are mounted to opposite ends of said pivot rod and said slots formed in said mounting member are spaced to align with said slides.

6. The apparatus as defined in claim 5 wherein said mounting member comprises a generally planar metal plate and further includes polymeric glide means extending on opposite sides of each of said slots to provide a lubricious contact with the associated slide.

7. The apparatus as defined in claim 6 wherein said cord means slidably engages and extends across said slides in opposite directions as said visor panel is moved to stabilize the motion of said visor panel.

8. The apparatus as defined in claim 7 wherein said cord means comprises two cords each having opposite ends with one of said opposite ends mounted to said mounting member adjacent one end of a first one of said slots and the other of said opposite ends mounted to said mounting member adjacent the opposed end of the second of said slots.

9. The apparatus as defined in claim 8 and further including resilient stops mounted to said mounting member at opposite ends of each of said slots.

10. The apparatus as defined in claim 9 wherein said slides are made of a polymeric material.

11. A vehicle visor assembly comprising:
   a visor mounting member including slot means for supporting a slide-out visor panel;
   a slide-out visor panel;
   pivot assembly means for mounting said slide-out visor panel to said slot means of said mounting member to allow said slide-out visor panel to move between a stored position and a use position, said pivot assembly including a pivot rod coupled to said slide-out visor panel and slide means mounted to said pivot rod and slidably extending within said slot means of said mounting member; and
   stabilizing means extending between said slide-out visor panel and said mounting member for controlling the motion of said slide-out visor panel, said stabilizing means comprises cord means extending between said slide-out visor panel and said mounting member for controlling the sliding motion of said slide-out visor panel as it is extended and retracted.

12. The apparatus as defined in claim 11 wherein said slot means comprises a pair of spaced parallel slots formed in said mounting member.

13. The apparatus as defined in claim 12 wherein said mounting member is a metal stamping and wherein said slot means include polymeric glide means on opposite edges of each of said slots.

14. The apparatus as defined in claim 12 wherein said pivot rod assembly further includes torque control means coupling said pivot rod to said slide-out visor panel.

15. The apparatus as defined in claim 14 wherein said cord means comprises two cords each having opposite ends with one of said opposite ends mounted to said mounting member adjacent one end of a first one of said slots and the other of said opposite ends mounted to said mounting member adjacent the opposed end of the second of said slots.

16. The apparatus as defined in claim 15 and further including resilient stops mounted to said mounting member at opposite ends of each of said slots.

17. A vehicle visor assembly comprising:
a visor mounting member including means for attaching said mounting member behind the headliner of a vehicle;
a visor panel;
means for coupling said visor panel to said mounting member for allowing said panel to slidably move between a stored position and a use position; and
stabilizing means extending between said visor panel and said mounting member, said stabilizing means comprising cord means extending between said visor panel and said mounting member for controlling the sliding motion of said visor panel as it is extended and retracted.

18. The apparatus as defined in claim 17 wherein said cord means comprises two cords which have opposite ends mounted to said mounting member and which cross each other along an edge of said visor panel and extend in slideable relationship to said coupling means.

19. The apparatus as defined in claim 18 wherein said coupling means comprises a pair of slots formed in said mounting member and slide means coupled to said visor panel and extending within said slots.

20. The apparatus as defined in claim 19 and further including a pivot rod with said slide means comprising slides mounted to opposite ends of said pivot rod and torque control means coupled between said pivot rod and said visor panel.

21. A vehicle visor assembly comprising:
a visor mounting member including a planar panel having a pair of spaced parallel extending slots for supporting a slide-out visor panel;
a slide-out visor panel;
slide means for mounting said slide-out visor panel to said slots of said mounting member to allow said slide-out visor panel to move between a stored position and a use position; and
stabilizing means extending between said slide-out visor panel and said mounting member for controlling the motion of said slide-out visor panel, said stabilizing means comprises cord means extending between said slide-out visor panel and said mounting member for controlling the sliding motion of said slide-out visor panel as it is extended and retracted.

22. The apparatus as defined in claim 21 wherein said slide means is made of a lubricious, polymeric material and said slots include polymeric glides at opposite edges for controlling the sliding motion of said slide-out visor panel as it is extended and retracted.

* * * * *